UNITED STATES PATENT OFFICE.

FREDERICK RANSOME, OF IPSWICH, ENGLAND.

IMPROVEMENT IN THE MANUFACTURE OF ARTIFICIAL STONE.

Specification forming part of Letters Patent No. 50,316, dated October 3, 1865.

*To all whom it may concern:*

Be it known that I, FREDERICK RANSOME, of Ipswich, in the county of Suffolk, England, a subject of the Queen of Great Britain, have invented or discovered certain new and useful Improvements in the Manufacture of Artificial Stone; and I, the said FREDERICK RANSOME, do hereby declare the nature of the said invention and in what manner the same is to be performed to be particularly described and ascertained in and by the following statement thereof—that is to say:

This invention has for its object improvements in the manufacture of artificial stone.

Artificial stone is now manufactured by me by compounding sand and similar substances with soluble silicate, (silicate of soda or potash,) and then converting the soluble into an insoluble silicate by means of a solution of chloride of calcium or an equivalent salt. The chloride of calcium remains in excess in the artificial stone, and if it be afterward dissolved out, either intentionally or by exposure to the weather, the stone is left slightly porous.

Now, according to my present invention I treat the artificial stone thus manufactured with a solution of such a nature as to decompose and precipitate an insoluble substance from the chloride of calcium or other soluble salt used to act upon the soluble silicate. The solution which I find most suitable and most commonly employ is one of carbonate or bicarbonate of soda or equivalent salt, which decomposes the excess of chloride of calcium and precipitates from it carbonate of lime, which is deposited in and well fills the pores of the stone.

In carrying out these improvements in the manufacture of artificial stone I prefer to prepare the artificial stone in the manner heretofore commonly practiced by me, and fully described in the specification of my previous patent, saturating the material with a solution of chloride of calcium or equivalent soluble salt of an alkaline earth, or of the chloride of aluminium or of iron. The chloride of calcium is, however, the salt I generally use. The stone being thus made as heretofore, I treat the same with another solution of such a nature as to decompose the excess of chloride of calcium or other soluble salt and precipitate an insoluble substance in the pores of the stone for the purpose of rendering the same more dense and compact. In cases where chloride of calcium has been used to act upon the soluble silicate, I immerse the stone so made in a solution of a carbonate of soda, (I generally use the bicarbonate, and the solution I prefer should be as nearly saturated as possible,) and I allow the stone to remain a sufficient length of time in such solution to decompose all the previously free chloride of calcium and produce carbonate of lime, which is precipitated throughout the structure of the stone. The time during which it is necessary to keep the stone in the solution will vary with the thickness of the block; but twenty-four hours will in any case be sufficient, although no injury will be done to the stone by leaving it in the solution a longer time. After being thus treated the stone is removed from the solution and allowed to remain until the excess of moisture has drained away, when it is afterward washed in water to remove any soluble salt that may be left in the stone.

In place of the solution of carbonate or bicarbonate of soda, other solutions may be employed, although not, I believe, so beneficially—as, for example, a solution of common alum—in which case sulphate of lime will be formed in the pores of the stone instead of carbonate of lime; or other suitable decomposing solution may be used, as sulphate or carbonate of magnesia.

What I claim is—

The treatment of artificial stone produced according to my previous patent by employing a solution of carbonate or bicarbonate of soda or equivalent salt to decompose the excess of chloride of calcium or equivalent salt and to produce an insoluble substance within the pores of the artificial stone, substantially as herein described.

FREDK. RANSOME.

Witnesses:
 JOHN DEAN,
 HENRY SOUTER,
*Both of No. 17 Gracechurch Street, London.*